J. W. BOWLEY.
MEANS FOR MEASURING THE FLOW OF LIQUIDS.
APPLICATION FILED APR. 4, 1911.
1,059,973.
Patented Apr. 29, 1913.
2 SHEETS—SHEET 1.
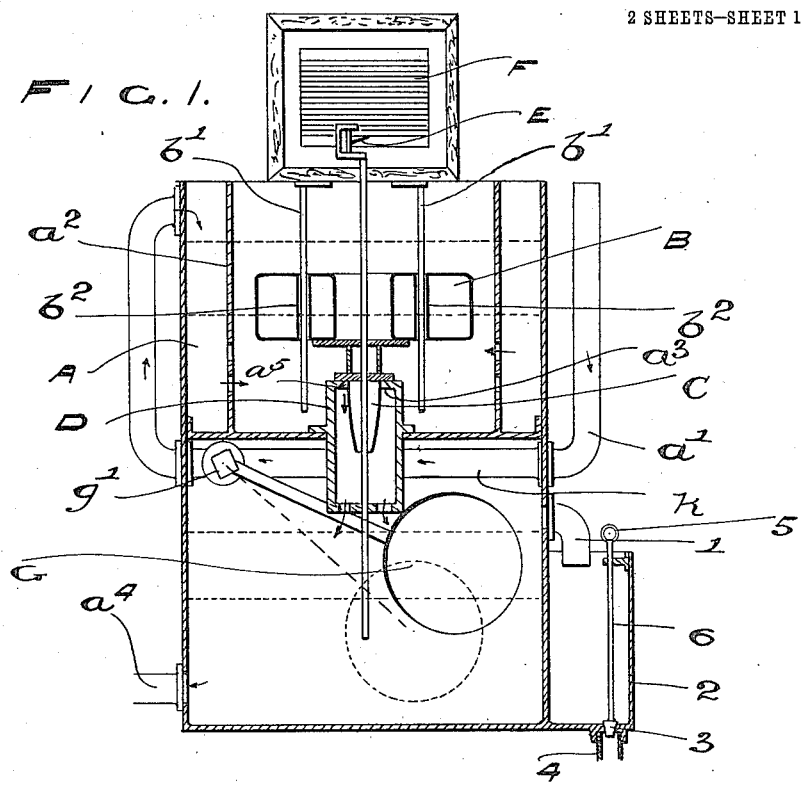
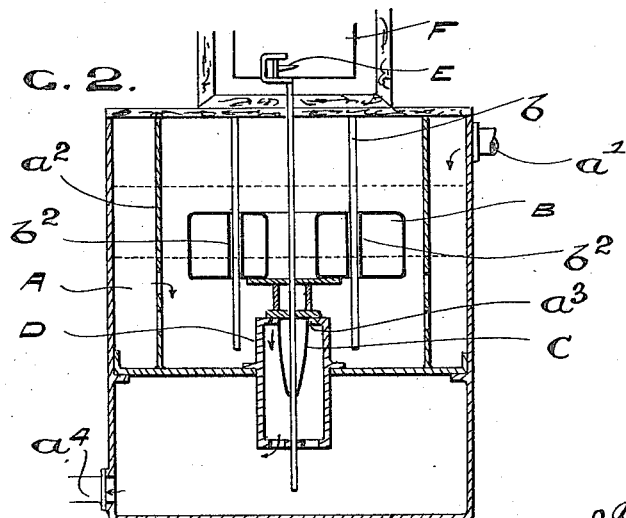
Witnesses:
B. Gleichman.
M. Sachs
Inventor
Joseph Wilfred Bowley
by B. Singer
atty

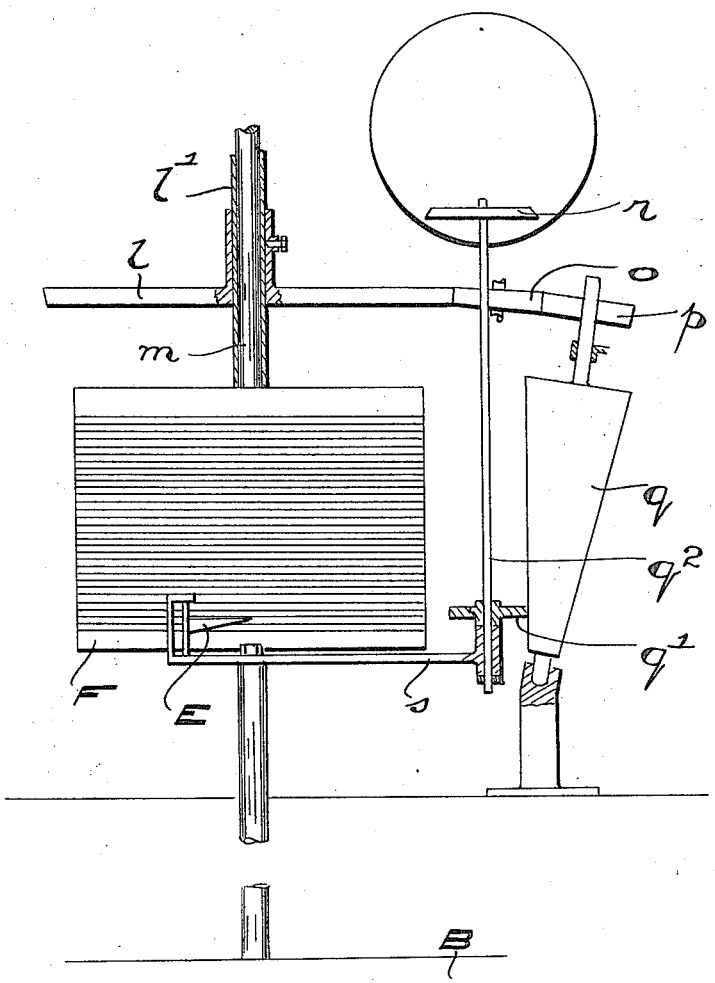

UNITED STATES PATENT OFFICE.

JOSEPH WILFRED BOWLEY, OF BIRMINGHAM, ENGLAND.

MEANS FOR MEASURING THE FLOW OF LIQUIDS.

1,059,973. Specification of Letters Patent. Patented Apr. 29, 1913.

Application filed April 4, 1911. Serial No. 618,784.

*To all whom it may concern:*

Be it known that I, JOSEPH WILFRED BOWLEY, a subject of the King of Great Britain, residing at Aintree Villa, Court Oak Road, Harborne, Birmingham, in the county of Warwick, England, engineer, have invented a certain new and useful Improved Means for Measuring the Flow of Liquids, of which the following is a specification.

This invention comprises improvements in and relating to means for measuring the flow of liquids and has for its object to provide apparatus simple in construction and direct in action which will automatically and accurately register the amount of liquid passing through the apparatus.

The apparatus broadly comprises a receptacle into which the liquid to be measured is permitted to flow, with a float in the receptacle carrying a valve plug which acts in conjunction with an outflow aperture from the receptacle to give certain definite apertures according to the position of the float and the valve plug. The positions of the plug are suitably recorded.

In order that the invention may be thoroughly understood and easily carried into practical effect I have appended hereunto explanatory drawings.

Figure 1 is a general sectional view showing an embodiment of the invention. Fig. 2 is a similar view to Fig. 1 showing a modification. Fig. 3 is an enlarged view showing apparatus for recording quantity in addition to rate of flow.

On these drawings A represents a liquid receptacle which may be of any approved form with an inlet $a^1$ and means such as the inner perforated cylinder $a^2$ for breaking the force of the inflowing liquid and preventing undue disturbance in the receptacle A. The outflow from the receptacle is through an aperture $a^3$ the material bordering which is preferably cut at an angle substantially as shown to form the actual measuring orifice having a sharp annular edge $a^5$.

In the receptacle A, is a float B which rises and falls with the liquid in the receptacle and suitably secured to this float B is a valve plug C. The float is suitably guided to insure its moving in a true vertical direction as by fixed guides $b^1$ engaging tubular stays $b^2$ in the float or in any other convenient manner.

The valve plug C secured to or connected with the float is of suitable contour composed of a number of known cross sectional areas which act in conjunction with the orifice of the outflow $a^3$ to give certain definite sizes or areas to that orifice as the plug is moved through it in one direction or the other by the action of the float. The variations in the amount of liquid flowing through the apparatus and the total amount in any given time can thus readily be calculated when these aperture sizes are recorded and known.

I find that a valve plug of conical form, as illustrated at C, is an advantageous form of construction. The outlet $a^3$ is provided with the knife edge $a^5$, and below the knife edge the aperture is cut away so that no acceleration or retardation of the feed or flow is caused, and further, no suction on the plug C could result. $a^4$ is the discharge orifice.

In the example shown the orifice is carried by a raised protecting chamber D which protects the valve and plug from eddies caused by the incoming liquid in vessel A and prevents the ingress of dirt, etc. The chamber is of such a shape and size as to give a clear and unobstructed passage below the knife edge $a^5$ or measure point or plane. A suitable method of recording the relation of the plug and the orifice is to connect the valve plug or float directly to a pencil or scriber E moving over a clockwork drum F or other suitable driven recording medium. The plug C may be adjustable in its connection with the float B so that its length of movement and its limits of measurement may be varied.

By this invention an exceedingly simple measuring apparatus is obtained which may be constructed to permit very considerable variation in the flow to take place while still accurately recording the amount passing. It will be understood that the proportions of the apertures of the receptacle are arranged so that the apparatus is able to cope with the flow of liquid in the system in which the measure is arranged.

In the lower chamber I may arrange a float G with a suitable connection to a cock $g^1$ in the pipe system $k$ leading to the inflow. An overflow tank may be provided as shown in Fig. 1, an overflow pipe 1 being adapted to discharge from the lower tank into such subsidiary tank 2. To empty the overflow tank, a plug 3 may be arranged in the bottom of the tank and operated by means of a handle 5 and spindle 6; the liquid discharges through a pipe 4.

Fig. 2 illustrates a modified form of the apparatus in which the lower tank is dispensed with the other parts being exactly similar and functioning in the same manner as the corresponding ones in Fig. 1.

In Fig. 3 is shown an apparatus for recording the number of gallons of liquid flowing through the apparatus in addition to denoting the rate of flow, a convenient arrangement comprising a rotating drum with a card F and scriber E as in the other figures, a gear wheel $l$ being driven from the same clock mechanism as that employed to drive the drum F. For connecting the said gear wheel $l$ to the clock a sleeve $l^1$ may be arranged concentrically with the shaft $m$ driving the drum F, gear wheels $o$, $p$ forming the driving connection for rotation of a friction drum $q$. The friction drum $q$ rotates a roller $q^1$ mounted on a vertical shaft $q^2$, said vertical shaft having a wheel $r$ at its upper extremity to operate the totaling up index, while at its lower extremity it is journaled upon the same arm $s$ which carries the scriber E and which moves up and down with the float B. It will be obvious that upon the float rising the friction roller $q^1$ is rotated at an increased speed by virtue of its contact with a larger diameter of the cone $q$.

What I claim as my invention and desire to secure by Letters Patent is:—

1. An apparatus for measuring a constantly flowing liquid comprising in combination, a receptacle having an inlet and an outlet, a float in said receptacle adapted to ascend upon a rise and descend upon a drop of the liquid level, and a conical element projecting freely through said outlet and operatively connected with the float to be raised and increase the size of the outlet upon a rise of the liquid level and lowered to decrease the size of the outlet upon a drop of the liquid level, and means controlled by the float for directly recording the variation of flow, substantially as described.

2. An apparatus for measuring a constantly flowing liquid comprising in combination, a receptacle having an inlet and an outlet, a float in said receptacle adapted to ascend upon a rise and descend upon a drop of the liquid level, and a conical element having its larger end uppermost and smaller end lowermost and projecting freely through said outlet and operatively connected with the float to be raised to increase the size of the outlet upon a rise of the liquid level and lowered to decrease the size of the outlet upon a drop of the liquid level, and means controlled by the float for directly recording the variation of flow, substantially as described.

3. An apparatus for measuring a constantly flowing liquid comprising in combination, a receptacle having an inlet and also provided with an outlet having a sharp edged inner wall, a float adapted to ascend upon a rise and descend upon a drop of the liquid level, and a conical element projecting freely through the sharp edged wall of said outlet and operatively connected with the float to be raised and increase the size of the outlet upon a rise of the liquid level and lowered to decrease the size of the outlet upon a drop of the liquid level, and means controlled by the float for directly recording the variation of flow, substantially as described.

4. An apparatus for measuring a constantly flowing liquid comprising in combination, a receptacle having an inlet and also provided with an outlet disposed at an elevation with respect to the bottom of the receptacle, a float adapted to ascend upon a rise and to descend upon a drop of the liquid level, and a conical element projecting freely into said outlet and operatively connected with the float to vary the size of the outlet upon ascent or descent of the float, and means controlled by the float for directly recording the variation of flow, substantially as described.

In witness whereof I have hereunto set my hand in the presence of two witnesses.

JOSEPH WILFRED BOWLEY.

Witnesses:
 ARTHUR H. BROWN,
 HOLLIS F. BROWN.

Copies of this patent may be obtained for five cents each, by addressing the "Commissioner of Patents, Washington, D. C."